(12) United States Patent
Bartholomew et al.

(10) Patent No.: US 7,174,310 B2
(45) Date of Patent: Feb. 6, 2007

(54) POINT OF SALE COSMETIC STATION

(76) Inventors: Julie R. Bartholomew, 689 Suffield, Birmingham, MI (US) 48009; Amy Green Deines, 11301 Ingram, Livonia, MI (US) 48150

( * ) Notice: Subject to any disclaimer, the term of this patent is extended or adjusted under 35 U.S.C. 154(b) by 151 days.

(21) Appl. No.: 10/274,514

(22) Filed: Oct. 18, 2002

(65) Prior Publication Data

US 2003/0090176 A1    May 15, 2003

Related U.S. Application Data

(60) Provisional application No. 60/352,120, filed on Jan. 24, 2002, provisional application No. 60/337,415, filed on Oct. 22, 2001.

(51) Int. Cl.
*G06Q 30/00*    (2006.01)
*B67D 5/06*    (2006.01)
*A47B 81/00*    (2006.01)

(52) U.S. Cl. ............... 705/26; 222/23; 222/52; 312/101

(58) Field of Classification Search ............ 700/233, 700/239, 231, 213; 356/402; 705/16, 26–27; 222/144, 52, 23; 221/9, 13, 24; 186/35, 186/36, 52, 59; 194/350, 353; 312/101; *G06F 17/00, G06F 19/00*
See application file for complete search history.

(56) References Cited

U.S. PATENT DOCUMENTS

| | | | | |
|---|---|---|---|---|
| 3,527,236 A | | 9/1970 | Anthony et al. | |
| 3,598,284 A | * | 8/1971 | Wessely | 222/18 |
| 3,688,947 A | * | 9/1972 | Reichenberger | 222/27 |
| 4,461,401 A | * | 7/1984 | Sasnett, Jr. | 222/27 |
| 4,628,974 A | | 12/1986 | Meyer | |
| 4,838,457 A | * | 6/1989 | Swahl et al. | 222/48 |
| 4,871,262 A | * | 10/1989 | Krauss et al. | 366/160.3 |
| 5,042,691 A | * | 8/1991 | Maldonado | 222/144.5 |
| 5,111,855 A | | 5/1992 | Boeck et al. | |
| 5,267,669 A | * | 12/1993 | Dixon et al. | 222/173 |
| 5,271,527 A | * | 12/1993 | Haber et al. | 222/43 |
| 5,379,916 A | * | 1/1995 | Martindale et al. | 222/1 |
| 5,622,692 A | * | 4/1997 | Rigg et al. | 424/63 |
| 5,730,330 A | * | 3/1998 | Reading | 222/113 |
| 5,785,960 A | * | 7/1998 | Rigg et al. | 424/63 |
| 5,867,403 A | * | 2/1999 | Sasnett et al. | 700/282 |
| 5,903,465 A | * | 5/1999 | Brown | 700/242 |
| 5,944,227 A | * | 8/1999 | Schroeder et al. | 222/144.5 |
| 5,984,146 A | * | 11/1999 | Kaufman | 222/190 |

(Continued)

FOREIGN PATENT DOCUMENTS

EP    0443741 B1  *  8/2001

(Continued)

OTHER PUBLICATIONS

Unknown, Coty introduces Jovan individuality, pp. 1-3, accessing date Jun. 8, 2001 at http://www.immedia.it.*

(Continued)

*Primary Examiner*—Cuong Nguyen
(74) *Attorney, Agent, or Firm*—Dobrusin & Thennisch PC

(57) ABSTRACT

A system for cosmetics point of sale display, including a station at which cosmetics may be displayed, dispensed, packaged or applied.

20 Claims, 6 Drawing Sheets

U.S. PATENT DOCUMENTS

| | | | |
|---|---|---|---|
| 6,073,834 A * | 6/2000 | Michael et al. ............ 232/43.1 |
| 6,119,895 A * | 9/2000 | Fugere et al. ................... 222/1 |
| 6,182,555 B1 * | 2/2001 | Scheer et al. ................. 99/290 |
| 6,200,210 B1 * | 3/2001 | Pratt ............................ 452/52 |
| 6,318,596 B1 * | 11/2001 | Wiesner ......................... 222/1 |
| 6,382,269 B1 * | 5/2002 | Tatsuno ........................ 141/94 |
| 6,383,542 B1 * | 5/2002 | Khodor et al. .............. 426/416 |
| 6,402,120 B1 | 6/2002 | Swaab |
| 6,412,658 B1 * | 7/2002 | Bartholomew et al. ......... 222/1 |
| D461,080 S * | 8/2002 | Bartholomew et al. ...... D6/515 |
| 6,516,245 B1 * | 2/2003 | Dirksing et al. ............ 700/233 |
| 6,557,369 B1 | 5/2003 | Phelps et al. |
| 6,607,100 B2 * | 8/2003 | Phelps et al. ................ 222/152 |
| 6,615,881 B2 * | 9/2003 | Bartholomew et al. ....... 141/18 |
| 6,622,064 B2 * | 9/2003 | Bartholomew et al. ..... 700/233 |
| 6,663,818 B2 | 12/2003 | Statham et al. |
| 6,672,341 B2 * | 1/2004 | Bartholomew et al. ....... 141/18 |
| 6,779,686 B2 * | 8/2004 | Bartholomew et al. ........ 222/1 |
| 6,782,307 B2 | 8/2004 | Wilmott et al. |
| 2001/0044579 A1 * | 11/2001 | Pratt ........................... 600/437 |
| 2002/0010528 A1 * | 1/2002 | Bartholomew et al. ..... 700/239 |
| 2002/0084288 A1 * | 7/2002 | Lewis et al. ............. 222/181.1 |
| 2002/0109270 A1 | 8/2002 | Swaab |
| 2002/0131985 A1 | 9/2002 | Shana'a et al. |
| 2002/0136700 A1 | 9/2002 | Margosiak et al. |
| 2003/0014324 A1 * | 1/2003 | Donovan et al. ............. 705/26 |
| 2003/0098314 A1 * | 5/2003 | Phelps et al. ................... 222/1 |
| 2003/0151611 A1 | 8/2003 | Turpin et al. |
| 2004/0004309 A1 | 1/2004 | Sears |
| 2004/0122553 A1 | 6/2004 | Phan et al. |
| 2004/0143367 A1 * | 7/2004 | Bartholomew et al. ..... 700/239 |
| 2004/0243361 A1 | 12/2004 | Steuben et al. |
| 2004/0245263 A1 | 12/2004 | Bartholomew et al. |

FOREIGN PATENT DOCUMENTS

| | | | |
|---|---|---|---|
| WO | WO9805417 | * | 2/1998 |
| WO | WO0175586 A1 | * | 10/2001 |
| WO | WO 02/05200 A2 | | 1/2002 |
| WO | WO03026458 A2 | * | 4/2003 |

OTHER PUBLICATIONS

Unknown, The shades of you: your colory palette, Your new image through color & line, California Fashion Image, Crown Summ Books, 1981, pp. 1-3, 17, 21-29, 97-105, 111-112, 120-127.*

Lovett et al., Measurement of the skin color of babies in hospital, National Lighting Conference, 1986, pp. 140-154.*

Evans, An Introduction to color, John Wiley & Sons, Inc. New York, 1948, pp. 87-90.*

Evans, An introduction to color, John Wiley & Sons, Inc. New York, 1948, pp. 87-90.*

Wyszecki et al., Color science:concepts and methods, quantitative data and formulae, 2nd ed., Wiley Interscience Publication, p. 63.*

J. Shibatani et al., Measurements of aging effects of facial color distribution and applications, Journal of Soc. Cosmetic Chem. Japan, vol. 19, No. 1, 1985, pp. 48-52.*

Steve Inskeep, National Public Radio hosts about VinoVenue (a wine tasting bar in San Francisco, http://www.vinovenue.net/), National Public Radio, copyright 2004.* www.vinovenue.net (Jan. 19, 2005), NPR Interview Transcript regarding same.

Cheskin, L. "Color Guide for Marketing Media", The MacMillan Co. pp. 133-140.

Information from www.colorlab-cosmetics.com.

Information from www.cosmetics.com/custblnd.htm.

Information from www.reflect.com.

Information from www.threecustom.com.

Ongoing prosecution of co-pending U.S. Appl. No. 10/755,574, Now Published as US2004/0143367.

Pamphlet of Jovan, "Express your individuality."

Search Report (1026-017WO).

Supplementary European Search Report (1026.001EP).

Website at www.cpcpkg.com.

Website at www.fast-fluid.com - "TiNTiA hair dye dispenser" p. 1.

Website at www.idexcorp.com/groups/fluidmgt.asp - "Fluid Management" pp. 1-2.

International Search PCT/US2005/040240 dated Apr. 3, 2006 (1026-022WO).

EP Office Action for Serial No. 01 922 731.3-2307, Applicant IMX Labs, Inc. dated Jun. 17, 2005 (1026-001EP).

EP Office Action for Serial No. 02 763 648.9-2313, Applicant IMX Labs, Inc. dated Jun. 6, 2005 (1026-017EP).

* cited by examiner

POINT OF SALE COSMETIC STATION

CLAIM OF BENEFIT OF FILING DATE

The present application claims the benefit of the filing date of U.S. Provisional Application Ser. Nos. 60/337,415, filed Oct. 22, 2001 and 60/352,120, filed Jan. 24, 2002, the contents of which are hereby incorporated by reference.

FIELD OF THE INVENTION

The present invention pertains to the field of cosmetics point of sale display.

BACKGROUND OF THE INVENTION

A need has developed for a custom cosmetic color selection system, pursuant to which a consumer or other customer (such as an intermediate retailer or wholesaler) can interact with the supplier to select a specific color, effect or both, to blend the resulting cosmetic product at or near the time of selection, such as at a point of sale location. This need has been met by the subject matter of co-pending, commonly owned U.S. patent application Ser. No. 09/818,389 (filed Mar. 27, 2001), Ser. No. 09/818,077 (filed Mar. 27, 2001), Ser. No. 29/142,835 (filed Jun. 1, 2001), Ser. No. 60/324,493 (filed Sep. 24, 2001), Ser. No. 60/352,120 (filed Jan. 24, 2002), Ser. No. 60/357,001 (filed Feb. 14, 2002), Ser. No. 29/157,727 (filed Mar. 22, 2002), Ser. No. 10/151,398 (filed May 20, 2002), Ser. No. 60/405,126 (filed Aug. 22, 2002), Ser. No. 10/246,391 (filed Sep. 18, 2002), Ser. No. 10/253,191 (filed Sep. 24, 2002), U.S. Pat. No. 6,412,658 (issued Jul. 2, 2002), and U.S. Pat. No. D461,080 (issued Aug. 6, 2002), which are all hereby expressly incorporated by reference herein. The present invention further improves the above subject matter by affording an improved system (including methods and apparatus) for the point of sale display and dispensing of cosmetics.

SUMMARY OF THE INVENTION

The present invention pertains to a point of sale system for the display and dispensing of cosmetics, such as nail polish, skin powders, skin creams, skin gels, or the like. The system preferably includes a cosmetic dispenser such as that disclosed in U.S. patent application Ser. Nos. 09/818,389 and 09/872,929, which is hereby incorporated by reference. It may also employ a cosmetic dispenser as disclosed in U.S. application Ser. No. 60/324,493, filed Sep. 24, 2001, incorporated by reference, and thus may include a dispenser with a plurality of syringes mounted on a rotatable structure.

Accordingly, preferably the system includes a dispensing apparatus (e.g., a pump system, such as a syringe pump system or otherwise). The dispensing apparatus may be adapted for custom formulation of a cosmetic color, texture, effect or the like. The dispensing apparatus may be manually operated. Preferably it is automated and driven by a suitable computer.

DETAILED DESCRIPTION OF THE PREFERRED EMBODIMENT

Figure 1:
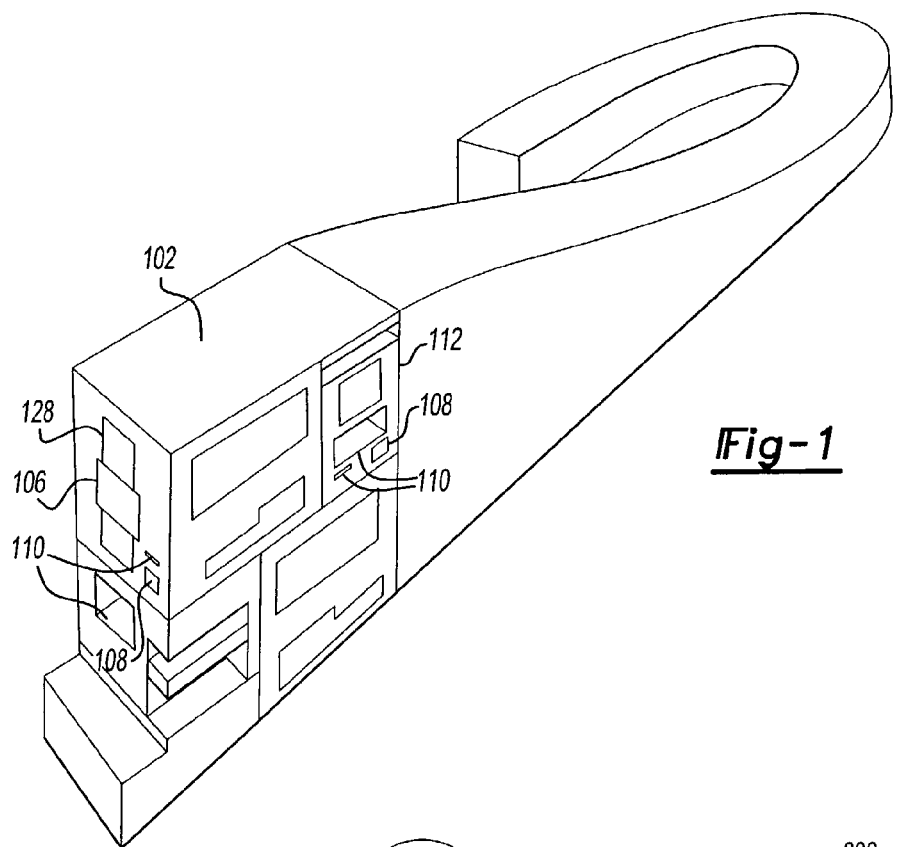
FIG. 1 is an illustrative example of a system in accordance with the present invention.

The present invention is directed to a unique system for the display and dispensing of cosmetics. In one preferred embodiment, referring to FIGS. 1 and 9–11, such as for use at a site where the point of sale is the same as the point of dispensing of a cosmetic, the system of the present invention is separated into two or more modular components (such as for use in a store or other more permanent site dedicated to the sale of these products), and in another it is integrated into a single structure (such for temporary sites, or use or operation within pre-existing businesses like a beauty salon, the corridor of a shopping mall, or within any of the businesses identified in the immediate previous paragraph). For instance, the modular components may include a delivery system 100 (e.g., dispensing device; which itself may include transparent components, e.g., fluid chambers) illustrated as having at least a portion of its components confined within a housing 102. The housing 102 preferably has openable panels (opaque, transparent or a combination thereof) 104 for allowing access to the interior and the enclosed components. Panels may include a clear plastic (e.g. acrylic, PETE, polycarbonate or the like). They may include glass, such as tempered glass. The housing may have a frame or other suitable structure, such as described in U.S. patent application Ser. Nos. 60/324,493; 60/352,120; 60/357,001; 60/405,126; 10/253,191; and U.S. Pat. No. D461,080, all hereby expressly incorporated by reference.

Preferably, any computer 18' (shown in phantom in FIG. 9) for operating the system resides in the housing 102, though optionally it may reside additionally or instead at a remote location, e.g., for communication over the Internet. However, one or more input devices may be provided as a user interface with the computer, dispensing system or both. For instance, in FIGS. 1 and 9–11, a first input device 106 enables a user to interact with the computer to determine a custom formulation. The user can thus make a computer-assisted formulation selection and input the information (e.g., via a touch screen as shown or some other input device) to the computer. When input is complete the computer will signal an output device 108 (e.g., a hot-stamp device, printer, bar code printer, or a suitable magnetized or electronic encoded smart card for retrievably storing data), which will generate a card or other printout containing such information, which will exit the slot 110. The card may be paper, plastic or the like. In one embodiment it is generally credit card sized. In another embodiment it is a standard index card size. It is also contemplated that information can be encoded in some other like medium, such as a passkey or the like.

The printout thus preferably contains information about the user's selection, including a formulation and optionally biographical information, account or credit information (for enabling an immediate or deferred transaction payment) or historical consumer information about the user. The computer optionally will store information about a user's selection, and correlate the same with a file created for the user and having a unique identifier, such as an account number, personal identification number, password or the like. The printout, however, enables the user to carry such information away and preserve it for later reference. Further, any of the first input devices may have a device for reading information from the printout, so a user can present such printout at a remote time and the reader reads it and retrieves information associated with the user from computer memory. As recognized from the above, the information may be stored on a cd for future archiving. Other suitable devices such as those described in U.S. patent application Ser. Nos. 10/246,391 and 10/253,191, may also be employed. Other devices contemplated include a miniature credit card with bar coding for swiping or reading by an infrared light unit or a wand for waving across a reader.

The user may be able to control operation of the dispensing device directly from the first input device 106. As shown in FIGS. 1 and 9–11, a second input device 112 may be provided for inputting data obtained from the information entered into the first input device 106. The second input device 112 (e.g., by manual entry to a touch screen, by a bar code reader, a card swiping device, or other suitable input device that may be the same as or different from the first input device) takes information obtained from the first input device 106 (either as stored electronically on the computer, as contained in the printout, or as provided in the first instance from the user without computer aid through use of the first input device), and signally commands dispensing from the dispensing device. Other input devices may also connect with the computer, such as a spectrophotometer 114, for providing information for the formulation selection.

Figure 9:
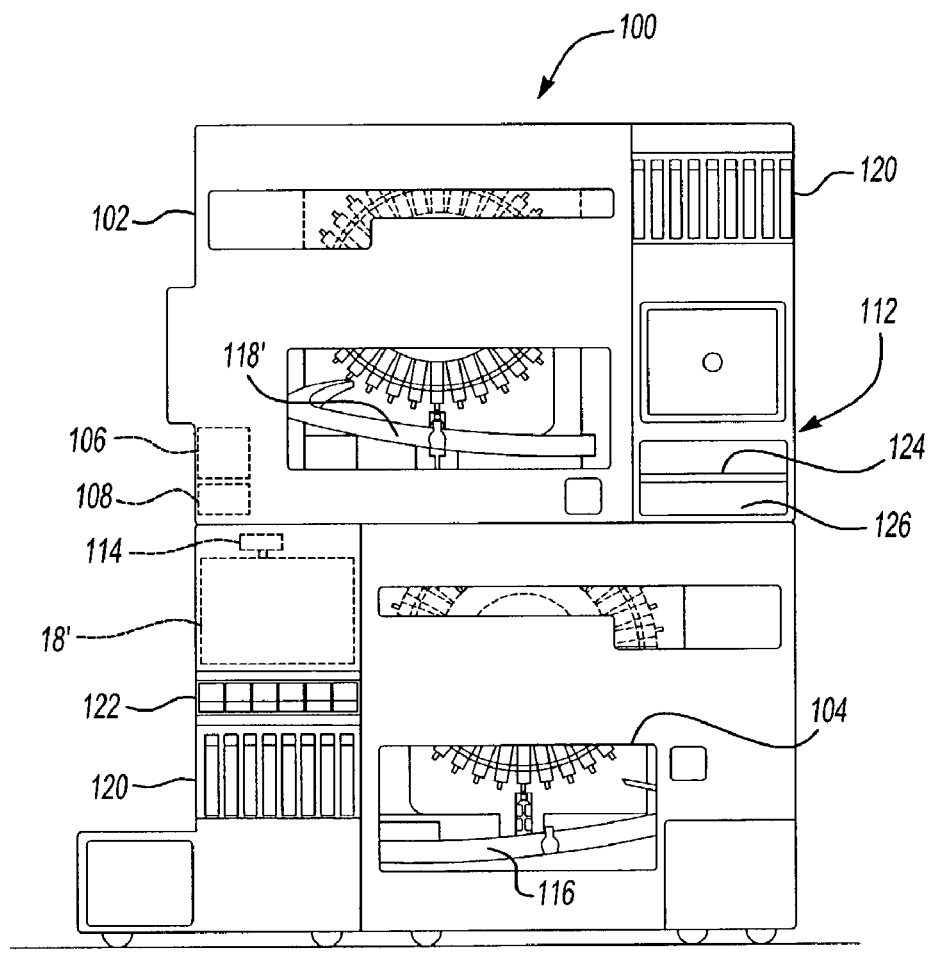
FIGS. 9–11 are illustrative examples of a modular system of the present invention.
Figure 10:
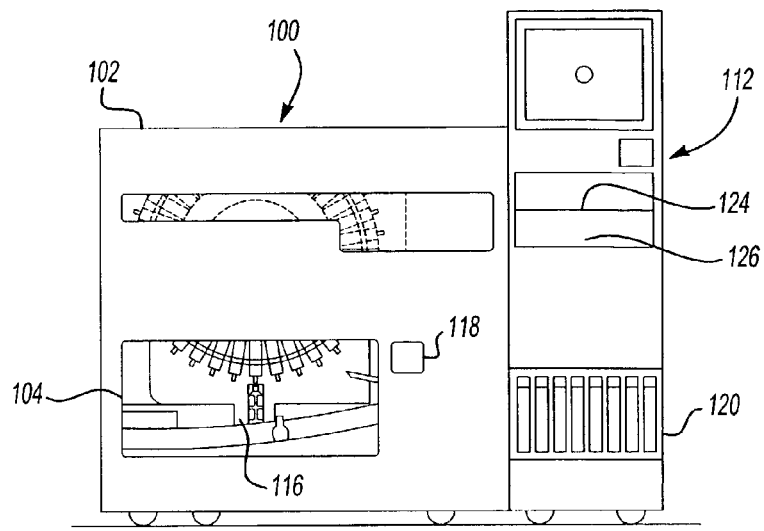
Figure 11:
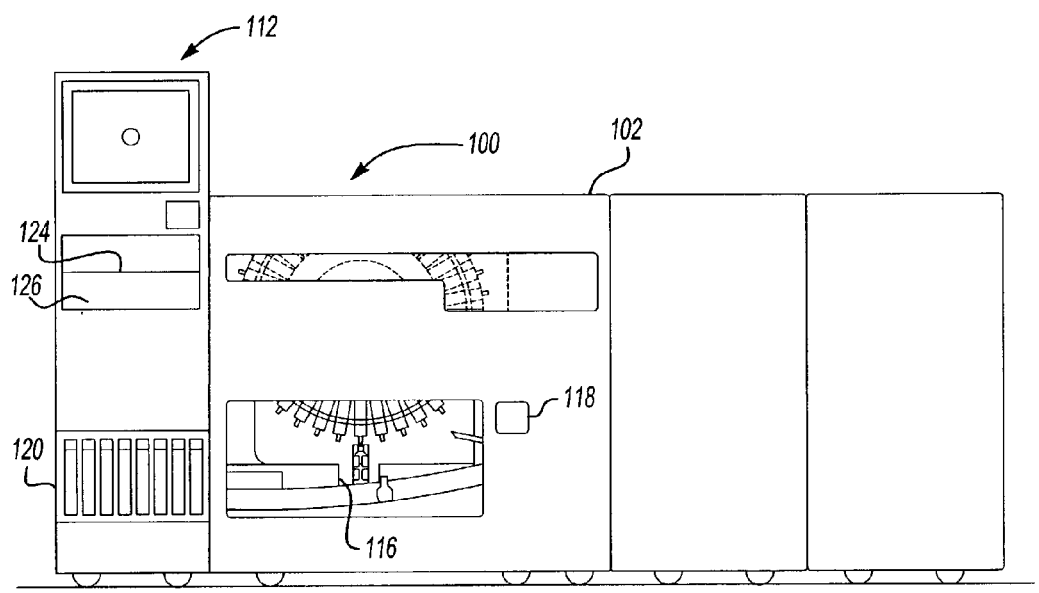

The housing 102 includes a support surface 116 (shown as static, but optionally may be translatable) upon which a container may rest while dispensing. Moreover, a vibratory shaker or other suitable mixer 118 can be mounted to or otherwise associated with the housing 102. Shown in FIG. 9 is an alternative site for a shaker 118'. Other sites are possible as well. In a preferred aspect, the present invention includes a dispensing device with a mixing or shaking device such as is disclosed in co-pending U.S. patent application Ser. Nos. 09/818,077, filed Mar. 27, 2001; 10/246, 391, filed Sep. 18, 2002; and 10/253,191, filed Sep. 24, 2002.

As shown, there may also be display shelves 120 associated with the pod 98. The display shelves may be stocked with a variety of different prepackaged base materials (e.g., for nail polishes, iridescent, metallic, sheer, opaque, glossy, white, clear, etc.). Thus a user could hand select base materials, removing them from a shelf and placing it by the dispenser for dispensing. Further, there may be an advertising or display light box 122. One or more additional workstations may also be employed, such as a table 124. As desired, the housing 102 may be opaque or transparent over some or all of its surfaces. For instance, a glass panel may cover and allow viewing of the dispensing device. A suitable drawer 126 (e.g., one having a glass face) or other panel may define additional storage or provide a location, equipment (e.g., a suitable dispenser) or both for performing additional steps in the preparation of the formulation, such as the addition of a fragrance. Further, a suitable stand 128 may support the computer 18'.

It will be appreciated that the functions performed by the above input and output devices may be divided among multiple devices or integrated into a single device. Further, functions performed by one device may alternatively be performed by another of the devices within the scope of the present invention. Multiple computers may likewise be employed, either independent of one another or linked for communication between or among one another. Moreover, the input devices can directly communicate with the dispensing system or indirectly communicate via an additional medium (e.g., computer). Each of the respective components may be controlled independently, through its own control system, or by way of one of the computers. It is also possible that the computer of the pod may be substituted or supplemented with a suitable connection to a network for accessing a remote computer.

The system also optionally includes a cash register, packaging station, a display station, an application station (which may be adapted for housing an on-site manicurist), a spectrophotometer or a combination of the above. One integrated system also incorporates some or all of the modular components recited above and may also afford counter space, seating, mirrors, or other consumer convenience features. The integrated systems may be assembled or prefabricated as individual units with suitable wiring for power supply or supply of other utilities such as telephone, cable, internet, satellite communication or the like.

Products offered for sale using the present system may be sold in combination with other nail care products (e.g., files, clippers, polish removers, top coats, base coats, images, effects or the like), cosmetics, and vanity accessories such as hair equipment or devices, jewelry, temporary or permanent tattoos, decals, stickers, fragrances, shoes, or other articles of clothing (some or all of which may also be customized in color or effect to match or complement the choice of nail polish color or effect).

It is also possible that the system of the present invention is employed in combination with other custom cosmetic systems, such as that disclosed in U.S. Pat. No. 5,945,112 (Flynn et al.) hereby incorporated by reference, which addresses a skin foundation customizer using a spectrophotometer to measure skin color and using such data to custom formulate a foundation.

The present invention also contemplates the methods of displaying, dispensing or both of cosmetic products at a point of sale, which includes installing or maintaining a system of the present invention, offering the products for sale, dispensing the products, packaging the products, applying the products to a customer or a combination of two or more of the above. Though retail applications are contemplated, the present invention may also be used at trade shows, demonstrations, private clubs or the like.

In another embodiment, shown in FIGS. 2–8, a system 200 for accomplishing some or all of the above-discussed functions is provided in which there is a first section 202 and a second section 204. The first and second sections may be joined or separated as shown. The first section 202 has an outer wall portion 206 and an inner wall portion 208. An upper surface 210 (e.g., flat, arcuate or a combination thereof) at least partially bridges the outer wall portion 206 with the inner wall portion 206. In one embodiment the height of the outer wall and inner wall portions is substantially constant over the entirety of the first section. The upper surface optionally includes openings, such as for venting, lighting or some other function or ornamentation. In another embodiment, the height gradually increases over substantially the entirety of the first section. In another embodiment, the height is constant for at least about 25% of the first section, and more preferably at least about 40% of the first section, with the balance of the first section having a gradually increasing height. The height increases may be one or more increments or steps, or they may be a gradually continuous.

A configuration such as in FIG. 1 is preferred for instances where a different station is desired for both dispensing and consummating sales transactions. In this regard, a preferred structure herein has horizontal surfaces (adapted for a work surface over at least a portion of the length), of at least two different heights relative to the floor. Seen in FIG. 1 is a gradually increasing surface. At its lowest height, the surface provides a work-station surface (e.g., a work surface for consummating a transaction, for applying a cosmetic, for packaging a cosmetic, or for performing some other function) about 2 to about 4 feet from a floor. At its highest point the surface can be about 5 to 10 feet from the floor. Other heights are also possible.

Figure 3:
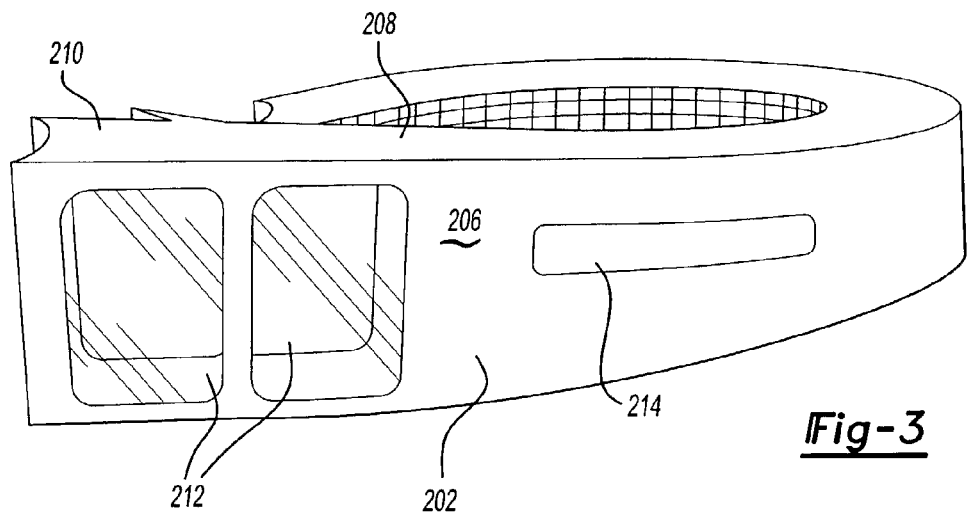
FIG. 3 is a side view of the illustrative example of a system in shown in FIG. 1.
Figure 4:
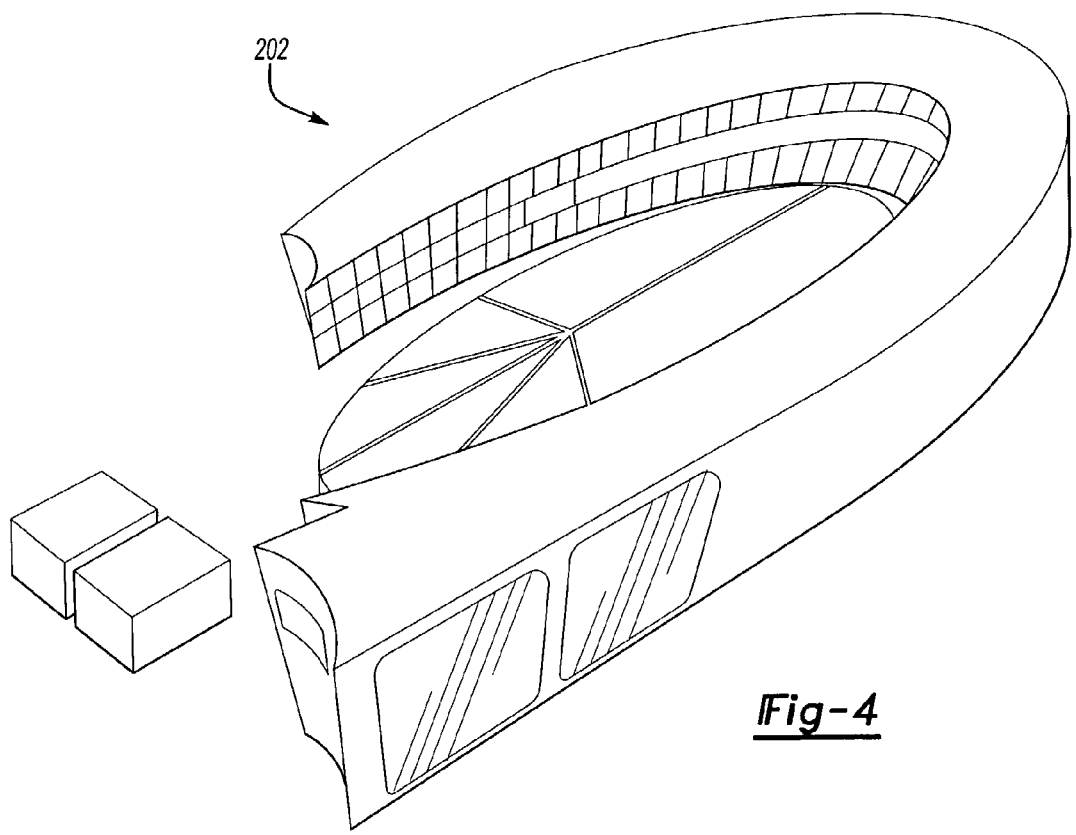
FIG. 4 is another illustrative example of a system in accordance with the present invention.
Figure 5:
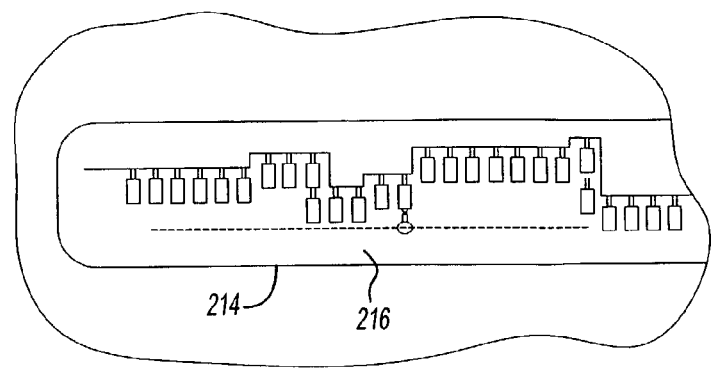
FIG. 5 is a partial cross-sectional view a system of the present invention.

In one preferred embodiment the height of the first section over a portion thereof is sufficient for enabling a mature person to be able to sit or possibly even stand therein. Accordingly, as seen in FIG. 3, the first section may include one or a plurality of private or individual booths 212 (with or without seating), that may be separate from each other or adjoining (e.g., with a partial wall). The booths may be accessed from the outer wall portion 206, the inner wall portion 208 or both. Optionally, they may be enclosed by a door, a curtain or otherwise. Either the inner wall portion 208, the outer wall portion or both may also include shelving or other display structure. It may also be adapted for housing a cosmetic dispensing system in accordance with the present invention. For example, referring also to FIG. 5, in one embodiment, an opening 214 is provided in which the dispenser may be housed (optionally behind at least a partially transparent panel 216, see also FIG. 8a) for operation or viewing of the dispenser, from either or both of the inner or outer wall portions.

The at least partially transparent panel may be a clear panel, such as acrylic, glass, or polycarbonate, it may be a perforated panel (e.g., textile, plastic, metal), or a combination thereof.

Figure 6:
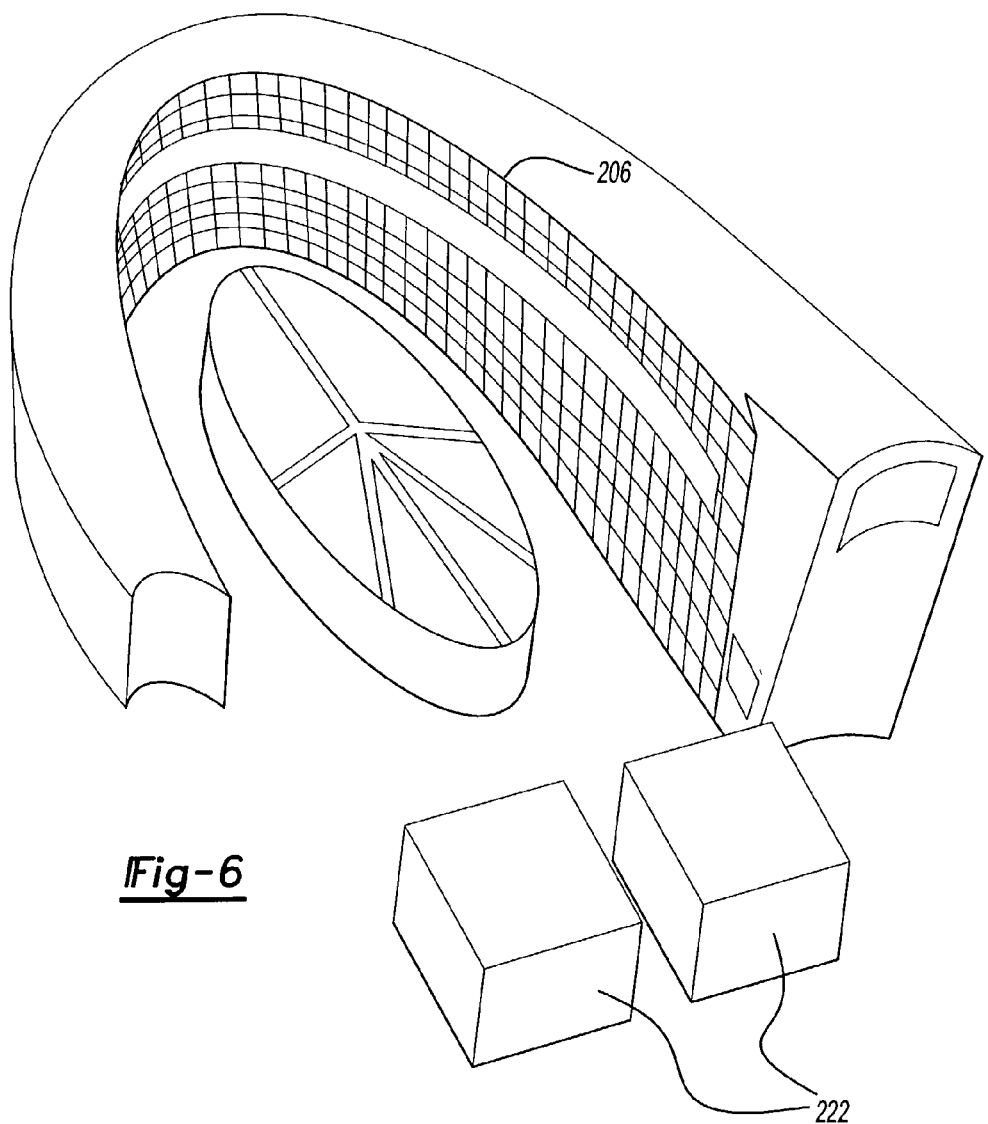
FIG. 6 is another illustrative example of a system in accordance with the present invention.
Figure 8A:
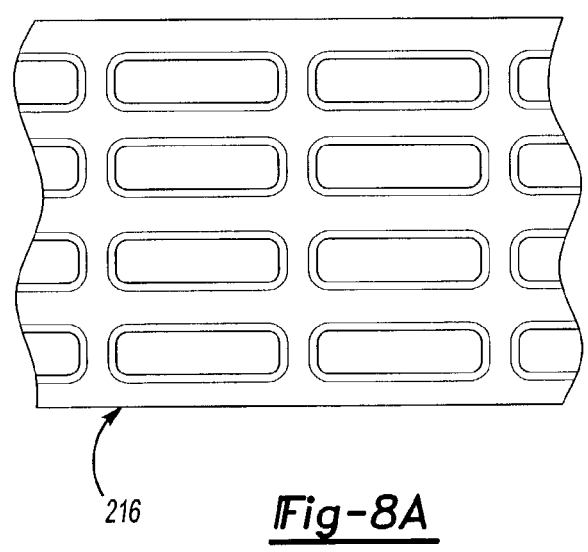
FIGS. 8A–8B are illustrative examples of alternative configurations for a transparent panel.
Figure 8B:
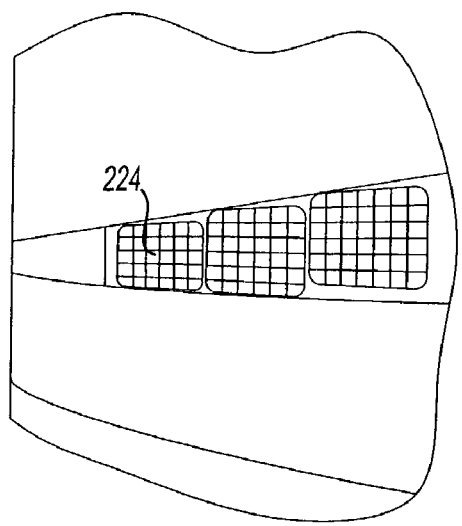

Suitable seating may also project from the outer wall portion 206, the inner wall portion or both. In one embodiment, the surface of the walls of the inner and outer wall portions 206, 208 are generally flat. In another embodiment, they are contoured (such as to appear to be upholstered, as seen in FIGS. 6 and 8a/8b (also showing examples of display shelving 224 and alternative ways for finishing metals or other materials that comprise a portion of the present system).

The second section 204 preferably is disposed at least partially within the perimeter of the first section 202. Preferably it is of suitable size and shape for functioning as a workstation, such as an application station, a packaging station, a check-out or sales station, or the like. Thus, preferably it includes an upper surface 218 that is substantially horizontal over at least about 25% and more preferably at least about 40% of its area, and still more preferably at least about 65% of its area.

Though depicted generally as having an elliptical second section 204 within a generally parabolic first section 202, other configurations are also possible, such as linear, circular or polygonal first sections 202 within a U, L, H, I, C, D, E, F, G, Q, J, M, W, O, A, or another suitable other alpha numeric character or other shape.

Figure 2:
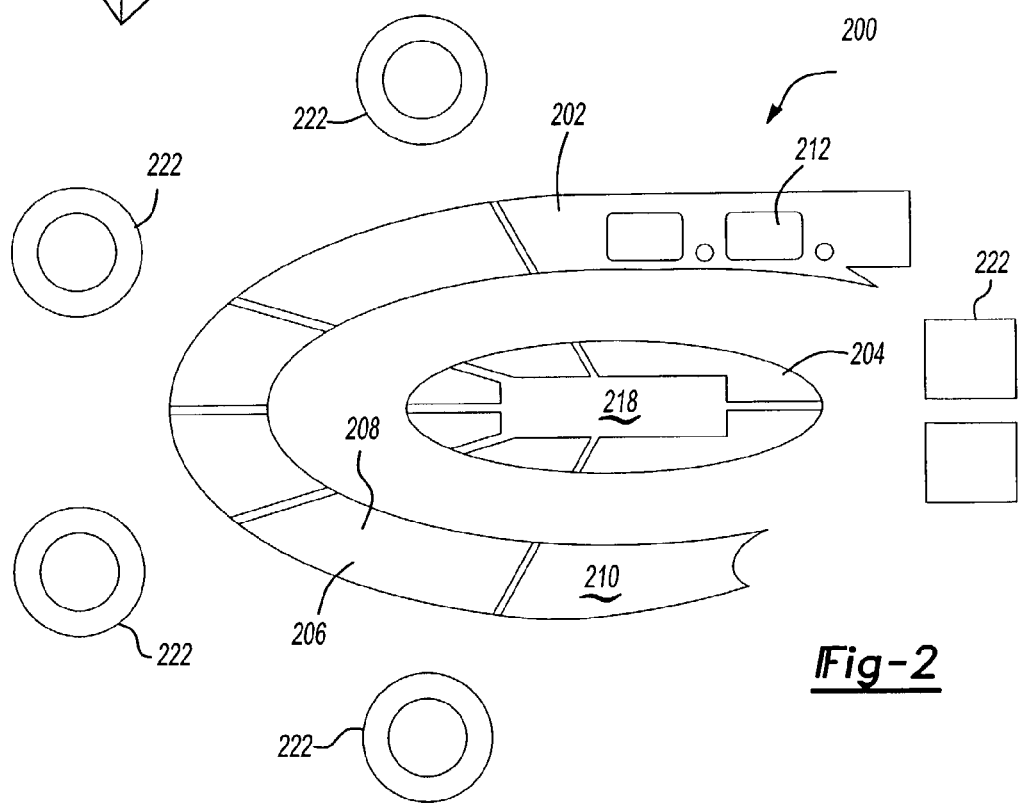
FIG. 2 is a top sectional view of the illustrative example of a system in shown in FIG. 1.
Figure 7:
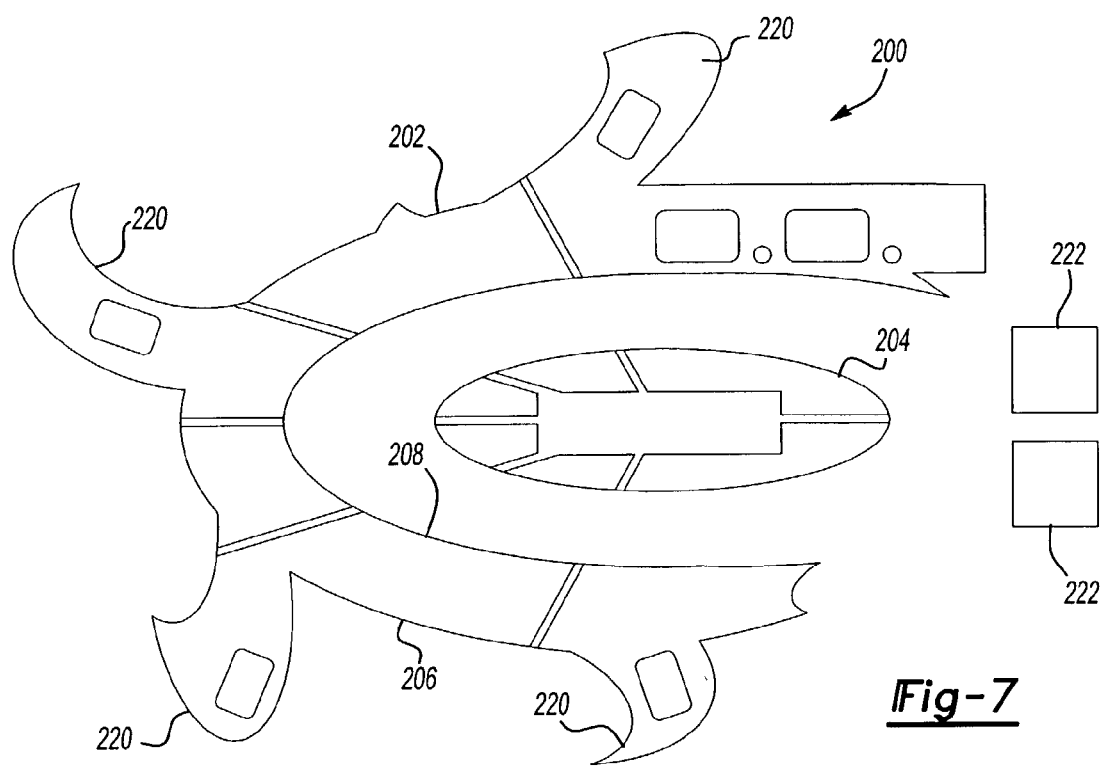
FIG. 7 is another illustrative example of a system in accordance with the present invention.

As seen in FIG. 7, it may also be possible to include one or more stations 220 (e.g., for display, application, dispensing, booths, or otherwise) that are attached to and project outwardly from the outer wall portion 206. As seen in FIGS. 2, 6 and 7, one or more additional free-standing or attached portions 222 may be provided for seating, display or the like.

The first section 202 may also be integrally attached to the second section 204, or it may optionally be omitted from the system.

As will be appreciated, the concepts of any of the above embodiments may be incorporated into any of the other embodiments. For instance, the functions of the computer and interactive system of the embodiment of FIG. 1 may be incorporated into the embodiments of FIGS. 2–11.

The sections herein may be built one permanent assembly, as a portable unit, as individual portable sub-units (e.g., rolled, lifted or otherwise) or otherwise.

In one embodiment, the dispensing machine used herein is controlled or is otherwise interfaced with suitable technology, such as ProPalette POS. In particular, a color palette user interface will be provided wherein the user will view and select a desired color. The color will be associated with a formulation, instructions about the preparation of which will be communicated to the dispenser. The dispenser will dispense ingredients according to the instructions. The information may be stored according to characteristics of the ingredients, the desired resulting product, or both, examples of which include information about one or more of Pantone identification, specific weight, density, reflectance, concentration, viscosity, inventory, price, location of ingredient within dispensing machine (or other information).

Although the invention has been described with particular reference to certain preferred embodiments thereof, variations and modifications can be effected within the spirit and scope of the following claims.

What is claimed is:

1. A system for dispensing cosmetics at a retail point of sale comprising:
    a first component that includes a housing for a delivery system comprising an automated cosmetic dispenser that includes (i) at least one panel including a window for allowing viewing of translating components of an automated cosmetic dispenser during dispensing operation, (ii) a plurality of ingredients containers, (iii) a computer for operating the automated cosmetic dispenser, and (iv) a mixer viewable through the at least one panel, and
    a second component that includes at least one first input device in signaling communication with the computer for enabling a user to select a custom cosmetic formulation, wherein a user input device is disposed adjacent to the dispensing device and is facing generally in the same direction as the window of the at least one panel.

2. The system of claim 1, wherein the ingredients containers are disposed about a substantially vertically disposed rotatable structure.

3. The system of claim 1 further comprising an output device for encoding a medium with information about a customer's formulation selection.

4. The system of claim 3, wherein the medium is a passkey.

5. The system of claim 1, further comprising a spectrophotometer.

6. The system of claim 1, wherein said first and second components comprise modular components.

7. The system of claim 6, wherein said modular components adjoin each other and each include an outer wall portion, an inner wall portion and upper surface bridging said outer wall portion with said inner wall portion.

8. The system of claim 7, wherein the upper surface of said modular components includes at least two different heights with respect to a floor supporting the system.

9. The system of claim 8, wherein the upper surface of one of the modular components include a height between about 2 to 4 feet from the floor and the upper surface of the other component includes a height between about 5 to 10 feet from the floor.

10. The system of claim 7, wherein said upper surface of said first component disposed higher than said upper surface of said second component.

11. The system of claim 7, wherein said upper surface of said first component further comprises a gradual reduction in height from said outer wall portion along said upper surface to form a continuous curve.

12. The system of claim 7, wherein said upper surface of said housing further comprises a plurality of steps forming a reduction in height from said outer wall portion along said upper surface to form a stepped curve.

13. The system of claim 7, wherein said upper surfaces of said first component and said second component comprise a parabolic shaped form.

14. The system of claim 1, wherein said automated cosmetic dispenser includes a syringe dispenser.

15. The system of claim 1, wherein said system includes an application station for applying a dispensed cosmetic to a retailer customer.

16. The system of claim 1, further comprising at least one second input device.

17. The system of claim 1, wherein the panel is openable for allowing access to interior component of the housing.

18. The system of claim 1, wherein said mixer is a vibratory shaker.

19. The system of claim 1, wherein said first and second components include at least two different heights relative to a floor portion supporting the system.

20. The system of claim 1, wherein the ingredients containers are arranged in generally side-by-side linear relationship for viewing behind an at least partially transparent panel.

* * * * *